(12) United States Patent
Doetsch et al.

(10) Patent No.: US 11,236,183 B2
(45) Date of Patent: Feb. 1, 2022

(54) POLYETHYLENE COMPOSITION HAVING HIGH SWELL RATIO, FNCT AND IMPACT RESISTANCE

(71) Applicant: Basell POLYOLEFINE GMBH, Wesseling (DE)

(72) Inventors: Diana Doetsch, Bad Kreuznach (DE); Bernd Lothar Marczinke, Romerberg (DE); Gerhardus Meier, Houston, TX (US); Ulf Schueller, Weiterstadt (DE); Claudio Fibla, The Hague (NL)

(73) Assignee: Basell Polyolefine GmbH, Wesseling (DE)

( * ) Notice: Subject to any disclaimer, the term of this patent is extended or adjusted under 35 U.S.C. 154(b) by 0 days.

(21) Appl. No.: 17/053,633

(22) PCT Filed: May 14, 2019

(86) PCT No.: PCT/EP2019/062264
§ 371 (c)(1),
(2) Date: Nov. 6, 2020

(87) PCT Pub. No.: WO2019/219633
PCT Pub. Date: Nov. 21, 2019

(65) Prior Publication Data
US 2021/0238320 A1 Aug. 5, 2021

(30) Foreign Application Priority Data
May 14, 2018 (EP) ..................... 18171992

(51) Int. Cl.
*C08F 10/02* (2006.01)
*C08F 110/02* (2006.01)
*C08F 2/00* (2006.01)
*C08F 210/16* (2006.01)

(52) U.S. Cl.
CPC .............. *C08F 10/02* (2013.01); *C08F 2/001* (2013.01); *C08F 110/02* (2013.01); *C08F 210/16* (2013.01); *C08F 2500/05* (2013.01); *C08F 2500/07* (2013.01); *C08F 2500/09* (2013.01); *C08F 2500/12* (2013.01); *C08F 2500/17* (2013.01)

(58) Field of Classification Search
None
See application file for complete search history.

(56) References Cited

FOREIGN PATENT DOCUMENTS

| JP | 2016132751 A | 7/2016 |
|---|---|---|
| JP | 2017533990 A | 11/2017 |
| RU | 2255094 C2 | 6/2005 |
| RU | 2405007 C2 | 11/2010 |
| RU | 2602265 C1 | 11/2016 |
| WO | 03016366 A1 | 2/2003 |

(Continued)

OTHER PUBLICATIONS

International Search Report and Written Opinion dated Aug. 29, 2019 (Aug. 29, 2019) for Corresponding PCT/EP2019/062264.

*Primary Examiner* — Richard A Huhn (57) ABSTRACT

A polyethylene composition for producing blow-molded hollow articles, having the following features:
1) a density from 0.945 to 0.958 g/cm³, determined according to ISO 1183 at 23° C.;
2) a ratio MIF/MI10 from 2 to 10;
3) a $\eta_{0.02}$ from 200,000 to 800,000 Pa·s;
4) a LCBI equal to or lower than 0.80; and
5) a ratio ($\eta_{0.02}$/1000)/LCBI equal to or greater than 350.

12 Claims, 1 Drawing Sheet

(56) References Cited

FOREIGN PATENT DOCUMENTS

| | | |
|---|---|---|
| WO | 2014134193 A1 | 9/2014 |
| WO | 2014206854 A1 | 12/2014 |
| WO | 2016206957 A1 | 12/2016 |
| WO | 2016206958 A1 | 12/2016 |

POLYETHYLENE COMPOSITION HAVING HIGH SWELL RATIO, FNCT AND IMPACT RESISTANCE

This application is the U.S. National Phase of PCT International Application PCT/EP2019/062264, filed May 14, 2019, claiming benefit of priority to European Patent Application No. 18171992.3, filed May 14, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to a polyethylene composition and extrusion blow-molded hollow articles made therefrom.

BACKGROUND OF THE INVENTION

In some instances, polyethylene compositions are used for their balance of mechanical properties and processability.

SUMMARY OF THE INVENTION

In a general embodiment, the present disclosure provides a polyethylene composition having the following features:
1) a density from 0.945 to 0.958 g/cm³, alternatively from 0.948 to 0.955 g/cm³, determined according to ISO 1183 at 23° C.;
2) a ratio MIF/MI10 from 2 to 10, alternatively from 4 to 8, where MIF is the melt flow index at 190° C. with a load of 21.60 kg, and MI10 is the melt flow index at 190° C. with a load of 10 kg, both determined according to ISO 1133;
3) a $\eta_{0.02}$ from 200,000 to 800,000 Pa·s, alternatively from 200,000 to 600,000 Pa·s, alternatively from 250,000 to 600,000 Pa·s, alternatively from 350,000 to 600,000 Pa·s, wherein $\eta_{0.02}$ is the complex shear viscosity at an angular frequency of 0.02 rad/s, measured with dynamic oscillatory shear in a plate-plate rotational rheometer at a temperature of 190° C.;
4) a long-chain branching index, LCBI, equal to or lower than 0.80, alternatively lower than 0.75, alternatively equal to or lower than 0.74, alternatively with a lower limit of 0.63 or 0.65, wherein LCBI is the ratio of the measured mean-square radius of gyration $R_g$, measured by GPC-MALLS, to the mean-square radius of gyration for a linear PE having the same molecular weight, at a molecular weight of 1,000,000 g/mol.; and
5) a ratio $(\eta_{0.02}/1000)$/LCBI, which is between $f_{0.02}$ divided by 1000 and LCBI, equal to or greater than 350, alternatively equal to or greater than 380.

BRIEF DESCRIPTION OF THE DRAWINGS

These and other features of the present disclosure will become better understood with reference to the following description and appended claims, and accompanying drawing FIGURE where:

It should be understood that the various embodiments are not limited to the arrangements and instrumentality shown in the drawing FIGURE.

DETAILED DESCRIPTION OF THE INVENTION

Figure 1:
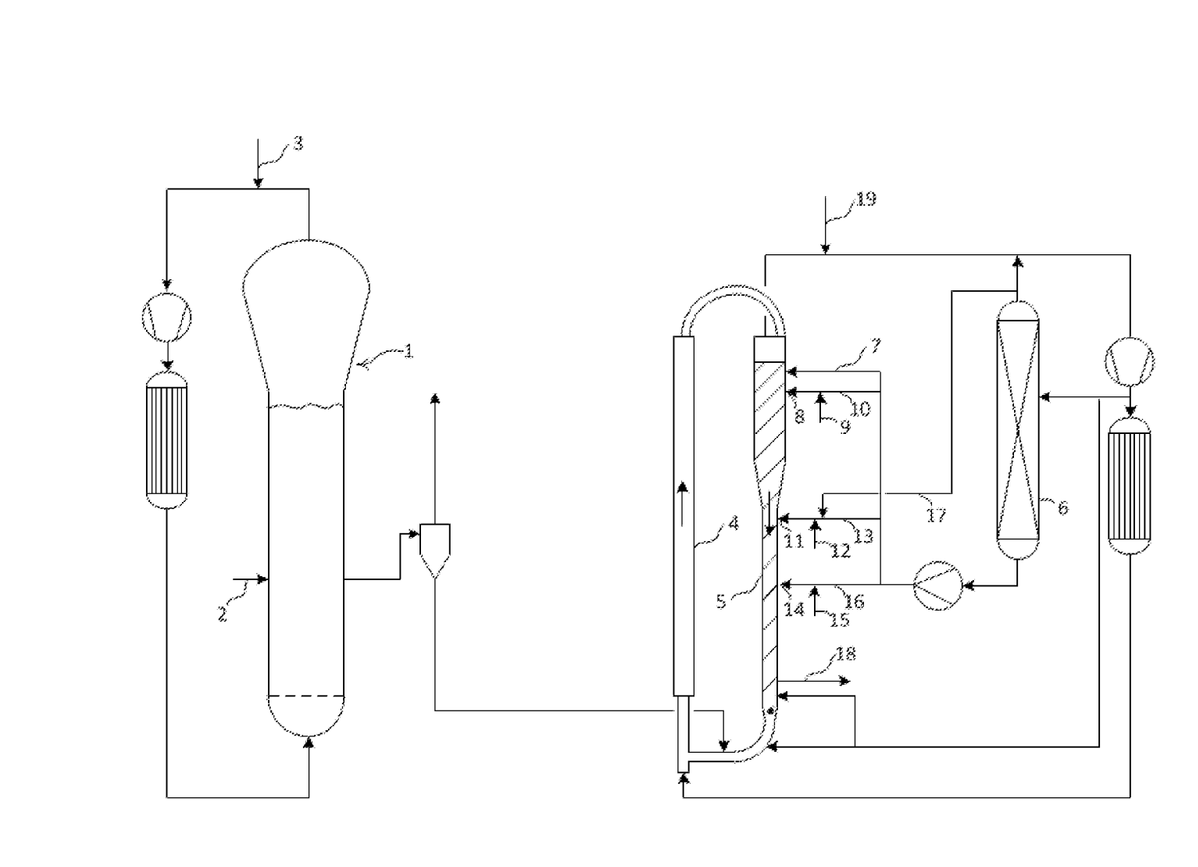
The FIGURE is a simplified process-flow diagram of two serially connected gas-phase reactors for use in ethylene polymerization processes to produce various polyethylene compositions.

As used herein, the expression "polyethylene composition" embraces, as alternatives, both a single ethylene polymer and an ethylene polymer composition, including a composition of two or more ethylene polymer components. In some embodiments, the ethylene polymer components have different molecular weights. As used herein, this composition may be referred to as "bimodal" or "multimodal" polymer.

In some embodiments, the present polyethylene composition is made from or contains one or more ethylene copolymers derived from ethylene and one or more comonomers.

The features herein defined, including the previously defined features 1) to 5), are referred to as features of the ethylene polymer or ethylene polymer composition. In some embodiments, the addition of other components, like additives, modify one or more of the features.

It is believed that the ratio MIF/MI10 provides a rheological measure of molecular weight distribution.

Another measure of the molecular weight distribution is provided by the ratio $M_w/M_n$, where $M_w$ is the weight average molecular weight and $M_n$ is the number average molecular weight, measured by GPC (Gel Permeation Chromatography).

In some embodiments, the $M_w/M_n$ values for the present polyethylene composition range from 15 to 40, alternatively from 20 to 35.

In some embodiments, the $M_w$ values are from 250,000 g/mol to 800,000 g/mol, alternatively from 300,000 g/mol to 700,000 g/mol.

In some embodiments, the present polyethylene composition has at least one of the following additional features.
  a Mz from 1,500,000 to 8,000,000 g/mol, alternatively from 2,500,000 to 4,500,000 g/mol, alternatively from 2,500,000 to 3,500,000 g/mol;
  a MIF from 0.5 to 10 g/10 min., alternatively from 1 to 8 g/10 min.;
  a comonomer content equal to or less than 2% by weight, with respect to the total weight of the composition;
  a HMWcopo index from 1 to 15,
wherein the HMWcopo index is determined according to the following formula:

$$\text{HMWcopo} = (\eta_{0.02} \times t_{maxDSC})/(10^5)$$

where $\eta_{0.02}$ is the complex shear viscosity of the melt in Pa·s, measured at a temperature of 190° C., in a parallel-plate (or plate-plate) rheometer under dynamic oscillatory shear mode with an applied angular frequency of 0.02 rad/s; the tmaxDSC is the time, in minutes, to reach the maximum value of heat flow (in mW) of crystallization (time at which the maximum crystallization rate is achieved, equivalent to the t1/2 crystallization half-time) at a temperature of 124° C. under quiescent conditions, measured in isothermal mode in a differential scanning calorimetry apparatus, DSC;
  a ET higher than 30, alternatively higher than 40, alternatively from 30 or 40 to 500, wherein ET is calculated from:

$$ET = C_2/G^* \text{ at } \tan \delta = C_3,$$

wherein:
$G^* = [(G')^2(G'')^2]^{1/2}$,
tan $\delta = G''/G'$,
$C_2 = 10^6$ dyn/cm$^2$,
$C_3 = 1.5$,
$G'$=storage-modulus, and
$G''$=loss-modulus,
both $G'$ and $G''$ being measured with dynamic oscillatory shear in a plate-plate rotational rheometer at a temperature of 190° C.; or
Mz/Mw*LCBI of lower than 10.

In some embodiments, ranges of LCBI values are:
from 0.63 to 0.80; alternatively
from 0.63 to 0.74; alternatively
from 0.65 to 0.80; alternatively
from 0.65 to 0.74.

In some embodiments, ranges of ratio ($\eta_{0.02}$/1000)/LCBI are:
from 350 to 900; alternatively
from 350 to 800; alternatively
from 380 to 900; alternatively
from 380 to 800.

In some embodiments, values of Mz/Mw*LCBI, which is Mz/Mw multiplied by LCBI, are equal to or lower than 6.4, alternatively equal to or lower than 5.9.

In some embodiments, ranges of Mz/Mw*LCBI are:
from 3.2 to lower than 10; alternatively
from 3.2 to 6.4; alternatively
from 3.2 to 5.9; alternatively
from 3.5 to lower than 10; alternatively
from 3.5 to 6.4; alternatively
from 3.5 to 5.9.

In some embodiments, the comonomer or comonomers present in the ethylene copolymers are selected from olefins having formula $CH_2=CHR$ wherein R is an alkyl radical, linear or branched, having from 1 to 10 carbon atoms.

In some embodiments, the comonomer or comonomers are selected from the group consisting of propylene, butene-1, pentene-1, 4-methylpentene-1, hexene-1, octene-1 and decene-1. In some embodiments, the comonomer is hexene-1.

In some embodiments, the polyethylene composition is made from or contains:
A) 30-70% by weight, alternatively 40-60% by weight of an ethylene homopolymer or copolymer with density equal to or greater than 0.956 g/cm$^3$ and melt flow index MIE at 190° C. with a load of 2.16 kg, according to ISO 1133-1, of 0.5 g/10 min. or higher, alternatively of 1 g/10 min. or higher; and
B) 30-70% by weight, alternatively 40-60% by weight of an ethylene copolymer having a MIE value lower than the MIE value of component A), alternatively lower than 0.5 g/10 min.

The above percent amounts are given with respect to the total weight of A)+B). In some embodiments, component A) is an ethylene homopolymer.

In some embodiments, MIE ranges for component A) are.
0.5 to 10 g/10 min.; alternatively
0.5 to 8 g/10 min.; alternatively
1 to 10 g/10 min.; alternatively
1 to 8 g/10 min.

In some embodiments, the polyethylene composition is used for producing articles of manufacture. In some embodiments, the polyethylene composition is used for producing blow molded hollow articles. In some embodiments, the blow molded hollow articles are drums, alternatively L-Ring Drums (LRD) or Open Top Drums (OTD).

In some embodiments, the polyethylene compositions are characterized by the following properties.
Environmental stress crack resistance measured by FNCT 4 MPa/80° C. equal to or higher than 5 h, alternatively from 5 to 50 h;
Swell ratio higher than 180%, alternatively higher than 190%, alternatively having an upper limit being 220%;
Notched Tensile Impact Atn at −30° C. of 150 kJ/m$^2$ or higher, alternatively of 200 kJ/m$^2$ or higher; and
Absence of gels having gel diameter of higher than 700 µm.

In some embodiments, the blow-molding process is carried out by first plasticizing the polyethylene composition in an extruder at temperatures in the range from 180 to 250° C. and then extruding the polyethylene composition through a die into a blow mold, where the polyethylene composition is cooled.

In some embodiments, the polyethylene composition is prepared by a gas phase polymerization process in the presence of a Ziegler-Natta catalyst.

As used herein, a Ziegler-Natta catalyst is made from or contains the product of a reaction of an organometallic compound of group 1, 2 or 13 of the Periodic Table of elements with a transition metal compound of groups 4 to 10 of the Periodic Table of Elements (new notation). In some embodiments, the transition metal compound is selected from the group consisting of compounds of Ti, V, Zr, Cr and Hf. In some embodiments, the transition metal compound is supported on $MgCl_2$.

In some embodiments, the organometallic compounds are organo-Al compounds.

In some embodiments, the polyethylene composition is obtainable by using a Ziegler-Nana polymerization catalyst, alternatively a Ziegler-Natta catalyst made from or containing the product of a reaction of:
A) a solid catalyst component made from or containing a Ti, Mg, chlorine and one or more internal electron donor compounds ED;
B) an organo-Al compound; and optionally
C) an external electron donor compound $ED_{ext}$.

In some embodiments, the solid catalyst component A) is made from or contains one internal electron donor ED selected from esters of aliphatic monocarboxylic acids (EAA) and another internal donor $ED^1$ selected from cyclic ethers (CE) in an amount such that the EAA/CE molar ratio ranges from 0.02 to less than 20.

In some embodiments, the EAA/CE molar ratio ranges from 0.2 to 16, alternatively from 0.5 to 10.

In some embodiments, the internal electron donor compound (EAA) is selected from $C_1$-$C_{10}$, alternatively $C_2$-$C_5$, alkyl esters of $C_2$-$C_{10}$, alternatively $C_2$-$C_6$, aliphatic monocarboxylic acids. In some embodiments, the internal electron donor compound (EAA) is ethyl acetate.

In some embodiments, the (CE) internal donor is selected from cyclic ethers having 3-5 carbon atoms. In some embodiments, the (CE) internal donor is selected from the group consisting of tetrahydrofuran, tetrahydropirane and dioxane. In some embodiments, the (CE) internal donor is tetrahydrofuran.

In some embodiments, the (EAA+CE)/Ti molar ratio is higher than 1.5, alternatively ranges from 2.0 to 10, alternatively from 2.5 to 8.

In some embodiments, the content of (EAA) ranges from 1 to 30% wt with respect to the total weight of the solid catalyst component, alternatively from 2 to 20% wt. In some embodiments, the content of (CE) ranges from 1 to 20% wt with respect to the total weight of the solid catalyst component, alternatively from 2 to 10% wt.

In some embodiments, the Mg/Ti molar ratio ranges from 5 to 50, alternatively from 10 to 40.

In some embodiments, the Ti atoms derive from a Ti compound containing at least a Ti-halogen bond. In some embodiments, the Mg atoms derive from a magnesium dichloride. In some embodiments, the titanium compounds are the tetrahalides or the compounds of formula $TiX_n(OR^1)_{4-n}$, where $0<n<3$, X is halogen and $R^1$ is $C_1$-$C_{10}$ hydrocarbon group. In some embodiments, the halogen is chlorine. In some embodiments, the titanium compound is titanium tetrachloride.

In some embodiments, the method for preparing the catalyst component includes the following steps: (a) contacting a $MgX_2(R^2OH)_m$ adduct wherein $R^2$ groups are $C_1$-$C_{20}$ hydrocarbon groups and X is halogen, with a liquid medium made from or containing a Ti compound having at least a Ti—Cl bond, in an amount such that the Ti/Mg molar ratio is greater than 3, thereby forming a solid intermediate product; and (b) contacting the internal donor compounds (EAA) and (CE) with the solid intermediate product coming from step (a) and then washing the resulting product.

In some embodiments, the starting adducts are $MgX_2(R^2OH)_m$ adducts wherein $R^2$ groups are $C_1$-$C_{10}$ alkyl groups, X is chlorine and m is from 0.5 to 4, alternatively from 0.5 to 2. In some embodiments, the adducts are obtained by mixing alcohol and magnesium chloride in the presence of an inert hydrocarbon immiscible with the adduct, operating under stirring conditions at the melting temperature of the adduct (100-130° C.). Then, the emulsion is quenched, thereby causing the solidification of the adduct in form of spherical particles. In some embodiments, the preparation of these spherical adducts occur as described in U.S. Pat. Nos. 4,469,648, 4,399,054, or Patent Cooperation Treaty Publication No. WO98/44009. In some embodiments, the spherulization occurs by a spray cooling method as described in U.S. Pat. No. 5,100,849 or 4,829,034.

In some embodiments, the $MgX_2(R^2OH)_m$ adducts are $MgCl_2(EtOH)_m$ adducts wherein m is from 0.15 to 1.5 and having particle size ranging from 10 to 100 µm obtained by subjecting the adducts with a higher alcohol content to a thermal dealcoholation process carried out in nitrogen flow at temperatures between 50 and 150° C. until the alcohol content is reduced. In some embodiments, the adducts are prepared as described in European Patent No. EP 395083.

In some embodiments, the dealcoholation is carried out chemically by contacting the adduct with compounds reacting with the alcohol groups.

In some embodiments, these dealcoholated adducts are characterized by a porosity (measured by mercury method) due to pores with radius up to 1 µm ranging from 0.15 to 2.5 cm$^3$/g, alternatively from 0.25 to 1.5 cm$^3$/g.

In some embodiments, the reaction with the Ti compound is carried out by suspending the adduct in $TiCl_4$. In some embodiments, the $TiCl_4$ is cold. Subsequently, the mixture is heated up to temperatures ranging from 80-130° C. and kept at this temperature for 0.5-2 hours. In some embodiments, the treatment with the titanium compound is carried out one or more times. In some embodiments, the treatment with the titanium compound is carried out two times. At the end of the process the intermediate solid is recovered by separation of the suspension. In some embodiments, the separation is achieved by settling and removing of the liquid, filtration, or centrifugation. In some embodiments, the intermediate solid is subjected to washings with solvents. In some embodiments, the washings are carried out with inert hydrocarbon liquids. In some embodiments, the washings use more polar solvents such as halogenated hydrocarbons. In some embodiments, the polar solvents have a higher dielectric constant than the inert hydrocarbon liquids.

In some embodiments and in step (b), the intermediate solid is brought into contact with the internal donor compounds under conditions such as to fix on the solid an amount of donors such that the EAA/CE molar ratio ranges from 0.02 to less than 20.

In some embodiments, the contact is carried out in a liquid medium such as a liquid hydrocarbon. In some embodiments, the temperature at which the contact takes place varies depending on the nature of the reagents. In some embodiments, the temperature ranges from −10° to 150° C., alternatively from 0° to 120° C. In some embodiments, temperatures causing the decomposition or degradation of specific reagents are avoided even if the temperatures fall within the range. In some embodiments, the time of the treatment varies depending on conditions such as nature of the reagents, temperature, and concentration. In some embodiments, this contact step lasts from 10 minutes to 10 hours, alternatively from 0.5 to 5 hours. In some embodiments and to increase the final donor content, step (b) is repeated one or more times.

At the end of this step the solid is recovered by separation of the suspension. In some embodiments, the separative is achieved by settling and removing of the liquid, filtration, or centrifugation. In some embodiments, the solid is subjected to washings with solvents. In some embodiments, the washings are carried out with inert hydrocarbon liquids. In some embodiments, the washings use more polar solvents such as halogenated or oxygenated hydrocarbons. In some embodiments, the polar solvents have a higher dielectric constant than the inert hydrocarbon liquids.

In some embodiments and after step (b), a further step (c) is carried out subjecting the solid catalyst component coming from step (b) to a thermal treatment carried out at a temperature from 70 to 150° C.

In the step (c) of the method, the solid product recovered from step (b) is subject to a thermal treatment carried out at temperatures ranging from 70 to 150° C., alternatively from 80° C. to 130° C., alternatively from 85 to 100° C.

In some embodiments, thermal treatment involves suspending the solid coming from step (b) in an inert diluent like a hydrocarbon and then heating the solid while maintaining the system under stirring.

In some embodiments, thermal treatment involves heating the solid in a dry state by inserting the solid in a device having jacketed heated walls. In some embodiments, stirring is provided by mechanical stirrers placed within the device. In some embodiments, stirring is provided by using rotating devices.

In some embodiments, thermal treatment involves heating the solid coming from step (b) with a flow of hot inert gas such as nitrogen, alternatively by maintaining the solid under fluidization conditions.

In some embodiments, the heating time varies depending on conditions such as the maximum temperature reached. In some embodiments, the heating time ranges from 0.1 to 10 hours, alternatively from 0.5 to 6 hours. In some embodiments, higher temperatures allow the heating time to be shorter while lower temperatures involve longer reaction times.

In some embodiments, each of the step (b)-(c) is carried out immediately after the previous step, without isolating the solid product coming from that previous step. In some embodiments, the solid product coming from a previous step is isolated and washed before being subjected to the subsequent step.

In some embodiments, the process includes subjecting the solid coming from step (a) to a prepolymerization step (a2) before carrying out step (b).

In some embodiments, the pre-polymerization is carried out with an olefin $CH_2=CHR$, wherein R is H or a $C_1$-$C_{10}$ hydrocarbon group. In some embodiments, ethylene or propylene or mixtures thereof are pre-polymerized with one or more α-olefins, the mixtures containing up to 20% in moles of α-olefin, forming amounts of polymer from about 0.1 g up to about 1000 g per gram of solid intermediate, alternatively from about 0.5 to about 500 g per gram of solid intermediate, alternatively from 0.5 to 50 g per gram of solid intermediate, alternatively from 0.5 to 5 g per gram of solid intermediate. In some embodiments, the pre-polymerization step is carried out at temperatures from 0 to 80° C., alternatively from 5 to 70° C., in the liquid or gas phase. In some embodiments, the pre-polymerization of the intermediate with ethylene or propylene produces an amount of polymer ranging from 0.5 to 20 g per gram of intermediate. In some embodiments, the pre-polymerization is carried out with a cocatalyst such as organoaluminum compounds. In some embodiments, the solid intermediate is prepolymerized with propylene and the prepolymerization is carried out in the presence of one or more external donors. In some embodiments, the external donor is selected from the group consisting of silicon compounds of formula $R_a^4R_b^5Si(OR^6)_c$, wherein a and b are integer from 0 to 2, c is an integer from 1 to 3 and the sum (a+b+c) is 4; $R^4$, $R^5$, and $R^6$, are alkyl, cycloalkyl or aryl radicals with 1-18 carbon atoms optionally containing heteroatoms. In some embodiments, the silicon compounds have the values where a is 1, b is 1, c is 2, at least one of $R^4$ and $R^5$ is selected from branched alkyl, cycloalkyl or aryl groups with 3-10 carbon atoms optionally containing heteroatoms and $R^6$ is a $C_1$-$C_{10}$ alkyl group. In some embodiments, $R^6$ is methyl. In some embodiments, the silicon compounds are selected from the group consisting of methylcyclohexyldimethoxysilane (C donor), diphenyldimethoxysilane, methyl-t-butyldimethoxysilane, dicyclopentyldimethoxysilane (D donor), and diisopropyldimethoxysilane.

In some embodiments, the particles of solid catalyst components have substantially spherical morphology and average diameter between 5 and 150 µm, alternatively from 10 to 100 µm. As used herein, "particles having substantially spherical morphology" indicates that the particles have the ratio between the greater axis and the smaller axis equal to, or lower than 1.5, alternatively lower than 1.3.

In some embodiments, the solid catalyst components show a surface area (by B.E.T. method) between 10 and 200 $m^2$/g, alternatively between 20 and 80 $m^2$/g, and a total porosity (by B.E.T. method) higher than 0.15 $cm^3$/g, alternatively between 0.2 and 0.6 $cm^3$/g. In some embodiments, the porosity (Hg method) due to pores with radius up to 10,000 Å ranges from 0.25 to 1 $cm^3$/g, alternatively from 0.35 to 0.8 $cm^3$/g.

In some embodiments, the catalyst components form polymerization catalysts by reaction with Al-alkyl compounds, alternatively Al-trialkyl compounds. In some embodiments, the Al-trialkyl compounds are selected from the group consisting of Al-trimethyl, Al-triethyl, Al-tri-n-butyl, and Al-triisobutyl. In some embodiments, the Al/Ti ratio is higher than 1, alternatively between 5 and 800.

In some embodiments, the Al-alkyl compounds are alkylaluminum halides. In some embodiments, the alkylaluminum halides are alkylaluminum chlorides. In some embodiments, the alkylaluminum chlorides are selected from the group consisting of diethylaluminum chloride (DEAC), diisobutylaluminum chloride, Al-sesquichloride and dimethylaluminum chloride (DMAC) In some embodiments, mixtures of trialkylaluminum compounds with alkylaluminum halides are used. In some embodiments, the mixtures are selected from TEAL/DEAC mixtures and TIBA/DEAC mixtures.

In some embodiments, an external electron donor ($ED_{ext}$) is used during polymerization. In some embodiments, the external electron donor compound is the same as or different from the internal donors used in the solid catalyst component. In some embodiments, the external electron donor is selected from the group consisting of ethers, esters, amines, ketones, nitriles, silanes and mixtures thereof. In some embodiments, the external electron donor is selected from $C_2$-$C_{20}$ aliphatic ethers, alternatively from cyclic ethers. In some embodiments, the cyclic ethers have 3-5 carbon atoms. In some embodiments, the cyclic ethers are selected from the group consisting of tetrahydrofuran and dioxane.

In some embodiments, a halogenated compound (D) is uses as an activity enhancer. In some embodiments, the halogenated compound (D) is a mono or dihalogenated hydrocarbon. In some embodiments, the halogenated compound (D) is a monohalogenated hydrocarbon wherein the halogen is linked to a secondary carbon atom. In some embodiments, the halogen is selected from the group consisting of chloride and bromide.

In some embodiments, the halogenated compound (D) is selected from the group consisting of propylchloride, i-propylchloride, butylchloride, s-butylchloride, t-butylchloride 2-chlorobutane, cyclopentylchloride, cyclohexylchloride, 1,2-dichloroethane, 1,6-dichlorohexane, propylbromide, i-propylbromide, butylbromide, s-butylbromide, t-butylbromide, i-butylbromide i-pentylbromide, and t-pentylbromide. In some embodiments, the halogenated compound (D) is selected from the group consisting of i-propylchloride, 2-chlorobutane, cyclopentylchloride, cyclohexylchloride, 1,4-dichlorobutane and 2-bromopropane.

In some embodiments, the halogenated compound (D) is selected from the group consisting of halogenated alcohols, esters and ethers. In some embodiments, the halogenated compound (D) is selected from the group consisting of 2,2,2,-trichloroethanol, ethyl trichloroacetate, butyl perchlorocrotonate, 2-chloro propionate and 2-chloro-tetrahydrofuran.

In some embodiments, the activity enhancer is used in amounts such as to have the (B)/(D) molar ratio of higher than 3, alternatively in the range 5-50, alternatively in the range 10-40.

In some embodiments, components (A)-(D) are fed separately into the reactor where, under the polymerization conditions. In some embodiments, components (A)-(D) are pre-contacted, optionally in the presence of small amounts of olefins, for a period of time ranging from 1 minute to 10 hours, alternatively in the range from 2 to 7 hours. In some embodiments, the pre-contact is carried out in a liquid diluent at a temperature ranging from 0 to 90° C., alternatively in the range of 20 to 70° C.

In some embodiments, one or more alkyl aluminum compounds or mixtures thereof are used in the pre-contact. In some embodiments, more than one alkylaluminum compound is used in the pre-contact and used altogether. In some embodiments, more than one alkylaluminum compound is used in the pre-contact and added sequentially to the pre-contact tank. In some embodiments, the whole amount of aluminum alkyl compounds is not added at the pre-contact stage. In some embodiments, a portion of the aluminum alkyl compounds is added in the pre-contact and the remaining aliquot is fed to the polymerization reactor. In some embodiments and when more than one aluminum alkyl compound is used, one or more of the aluminum alkyl compounds are used in the precontact process and the other aluminum alkyl compounds are fed to the reactor.

In some embodiments, a precontact is carried out by first contacting the catalyst component with a first aluminum alkyl component which is a trialkylaluminum, then adding a second aluminum alkyl compound to the mixture, and then adding a third aluminum alkyl component which is a trialkylaluminum to the pre-contact mixture. In some embodiments, the first aluminum alkyl compound is tri-n-hexyl aluminum (THA). In some embodiments, the second aluminum alkyl compound is diethylaluminum chloride. In some embodiments, the third aluminum alkyl component is triethylaluminum. In some embodiments, the third aluminum alkyl component is added to the polymerization reactor.

In some embodiments, the total amount of aluminum alkyl compounds varies within broad ranges, alternatively from 2 to 10 mols per mole of internal donor in the solid catalyst component.

In some embodiments, the polyethylene composition is prepared in a process including the following steps, in any order:
a) polymerizing ethylene, optionally together with one or more comonomers, in a gas-phase reactor in the presence of hydrogen; and
b) copolymerizing ethylene with one or more comonomers in another gas-phase reactor in the presence of an amount of hydrogen less than step a);
where, in at least one of the gas-phase reactors, the growing polymer particles flow upward through a first polymerization zone (riser) under fast fluidization or transport conditions, leave the riser and enter a second polymerization zone (downcomer) through which the polymer particles flow downward under the action of gravity, leave the downcomer and are reintroduced into the riser, thereby establishing a circulation of polymer between the two polymerization zones.

In some embodiments and in the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between 0.5 and 15 m/s, alternatively between 0.8 and 5 m/s. As used herein, the terms "transport velocity" and "fast fluidization conditions" are as defined in "D. Geldart, Gas Fluidisation Technology, page 155 et seq., J. Wiley & Sons Ltd., 1986".

In some embodiments and in the second polymerization zone (downcomer), the polymer particles flow under the action of gravity in a densified form, thereby achieving high values of density of the solid (mass of polymer per volume of reactor), which approach the bulk density of the polymer.

The polymer flows vertically down through the downcomer in a plug flow (packed flow mode), thereby entraining small quantities of gas between the polymer particles.

In some embodiments, the ethylene polymer of step a) has a molecular weight lower than the ethylene copolymer obtained in step b).

In some embodiments, a polymerization of ethylene to produce a relatively low molecular weight ethylene polymer (step a) is performed upstream the copolymerization of ethylene to produce a relatively high molecular weight ethylene copolymer (step b). In some embodiments and in step a), a gaseous mixture made from or containing ethylene, hydrogen, optionally comonomer and an inert gas is fed to a first gas-phase reactor, alternatively a gas-phase fluidized bed reactor. In some embodiments, the polymerization is carried out in the presence of the Ziegler-Natta catalyst.

In some embodiments, hydrogen is fed in an amount depending on the catalyst used. In some embodiments, hydrogen is fed in an amount sufficient to obtain in step a) an ethylene polymer with a melt flow index MIE of 0.5 g/10 min. or higher. In some embodiments and in step a), the hydrogen/ethylene molar ratio is from 0.4 to 2 and the amount of ethylene monomer is from 2 to 20% by volume, alternatively from 5 to 15% by volume, based on the total volume of gas present in the polymerization reactor. In some embodiments, the remaining portion of the feeding mixture is represented by inert gases. In some embodiments, the remaining portion of the feeding mixture also includes one or more comonomers. In some embodiments, inert gases dissipate the heat generated by the polymerization reaction and are selected from nitrogen and saturated hydrocarbons. In some embodiments, the inert gas is propane.

In some embodiments, the operating temperature in the reactor of step a) is selected between 50 and 120° C., alternatively between 65 and 100° C. In some embodiments, the operating pressure is between 0.5 and 10 MPa, alternatively between 2.0 and 5 MPa.

In some embodiments, the ethylene polymer obtained in step a) represents from 30 to 70% by weight of the total ethylene polymer produced in the overall process, that is, in the first and second serially connected reactors.

In some embodiments, the ethylene polymer coming from step a) and the entrained gas are passed through a solid/gas separation step, thereby preventing the gaseous mixture coming from the first polymerization reactor from entering the reactor of step b) (second gas-phase polymerization reactor). In some embodiments, the gaseous mixture is recycled back to the first polymerization reactor while the separated ethylene polymer is fed to the reactor of step b). In some embodiments, the polymer is fed into the second reactor on the connecting part between the downcomer and the riser. It is believed that feeding the polymer at this point does not affect negatively flow conditions.

In some embodiments, the operating temperature in step b) is in the range of 65 to 95° C., and the pressure is in the range of 1.5 to 4.0 MPa. In some embodiments and to broaden the molecular weight distribution of the final ethylene polymer, the reactor of step b) is operated by establishing different conditions of monomers and hydrogen concentration within the riser and the downcomer.

In some embodiments and in step b), the gas mixture entraining the polymer particles and coming from the riser is partially or totally prevented from entering the downcomer, thereby obtaining two different gas composition zones. In some embodiments, the obstruction of the gas mixture is achieved by feeding a gas and/or a liquid mixture into the downcomer through a line placed at a point of the downcomer. In some embodiments, the feeding of the gas and/or liquid mixture occurs in the upper part of the downcomer. In some embodiments, the gas and/or liquid mixture has a composition, different from that of the gas mixture present in the riser. In some embodiments, the flow of the gas and/or liquid mixture is regulated, thereby generating an upward flow of gas counter-current to the flow of the polymer and acts as a barrier to the gas mixture entrained among the polymer particles coming from the riser. In some embodiments, the counter-current is generated at the top of the downcomer. In some embodiments, a mixture with low content of hydrogen is fed and produces the higher molecular weight polymer fraction in the downcomer. In some embodiments, one or more comonomers are fed to the downcomer of step b), optionally together with ethylene, propane or other inert gases.

In some embodiments, the hydrogen/ethylene molar ratio in the downcomer of step b) is between 0.001 and 0.1. In some embodiments, the ethylene concentration is from 0.5 to 15%, alternatively 0.5-10%, by volume, based on the total volume of gas present in the downcomer. In some embodiments, the comonomer concentration is from 0.01 to 0.1% by volume, based on the total volume of gas present in the downcomer. In some embodiments, the remaining portion of the gas present is propane or similar inert gases. In some embodiments, a relatively high amount of comonomer is bonded to the high molecular weight polyethylene fraction.

The polymer particles coming from the downcomer are reintroduced in the riser of step b).

In some embodiments and in the riser of step b), the hydrogen/ethylene molar ratio is in the range of 0.01 to 0.5 and the ethylene concentration is between 5 and 20% by volume based on the total volume of gas present in the riser.

In some embodiments, the comonomer content is controlled, thereby achieving the density of the final polyethylene. In some embodiments, the concentration of the comonomer in the riser is from 0.01 to 0.1% by volume, based on the total volume of gas present in the riser.

In some embodiments, the remaining portion of the gas present is propane or other inert gases.

In some embodiments, the polymerization process is as described in Patent Cooperation Treaty Publication No. WO2005019280.

EXAMPLES

The practice of the various embodiments, compositions and methods as provided herein are disclosed below in the following examples. These Examples are illustrative, and are not intended to limit the scope of the appended claims in any manner whatsoever.

The following analytical methods were used to characterize the polymer compositions.

Density

Determined according to ISO 1183-1:2012 at 23° C.

Complex Shear Viscosity $\eta_{0.02}$ (Eta (0.02)) and ET

Measured at angular frequency of 0.02 rad/s and 190° C. as follows.

Samples were melt-pressed for 4 min under 200° C. and 200 bar into plates of 1 mm thickness. Disc specimens of a diameter of 25 mm were stamped and inserted in the rheometer, which was pre-heated at 190° C. The measurement was performed using an Anton Paar MCR 300 rotational rheometer, with a plate-plate geometry. A frequency-sweep was performed (after 4 min of annealing the sample at the measurement temperature) at T=190° C., under constant strain-amplitude of 5%, measuring and analyzing the stress response of the material in the range of excitation frequencies $\omega$ from 628 to 0.02 rad/s. The standardized basic software was utilized to calculate the rheological properties, that is, the storage-modulus, G', the loss-modulus, G", the phase lag $\delta$ (=arctan(G"/G')) and the complex viscosity, $\eta^*$, as a function of the applied frequency, namely $\eta^*(\omega)=[G'(\omega))^2+G"(\omega)^2]^{1/2}/\omega$. The value of the latter at an applied frequency $\omega$ of 0.02 rad/s is the $\eta_{0.02}$.

ET was determined by the method described in R. Shroff and H. Mavridis, "New Measures of Polydispersity from Rheological Data on Polymer Melts," J. Applied Polymer Science 57 (1995) 1605-1626.

ET is calculated from:

$$ET = C_2/G^* \text{ at } \tan \delta = C_3$$

wherein:
 $G^* = [(G')^2 + (G")^2]^{1/2}$;
 an $\delta = G"/G'$;
 $C_2 = 10^6$ dyn/cm$^2$
 $C_3 = 1.5$,
 G'=storage-modulus, and
 G"=loss-modulus, both G' and G" being measured with dynamic oscillatory shear in a plate-plate rotational rheometer at a temperature of 190° C.

HMWcopo Index

HMWcopo (High Molecular Weight Copolymer) Index is defined by the following formula:

$$HMWcopo = (\eta_{0.02} \times t_{maxDSC})/(10^5)$$

The $t_{maxDSC}$ was determined using a Differential Scanning calorimetry apparatus, TA Instruments Q2000, under isothermal conditions at a constant temperature of 124° C. 5-6 mg of sample were weighed and brought into aluminum DSC pans. The sample was heated at a rate of 20K/min up to 200° C. and cooled down at a rate of 20K/min to the test temperature, thereby erasing the thermal history. The isothermal test began immediately after. The time was recorded until crystallization occurs. The time interval until the crystallization heat flow maximum (peak), $t_{maxDSC}$, was determined using the vendor software (TA Instruments). The measurement was repeated 3× times. An average value was then calculated (in min). If no crystallization was observed under these conditions for more than 120 minutes, the value of $t_{maxDSC}$=120 minutes was used for further calculations of the HMWcopo index.

The melt viscosity $\eta_{0.02}$ value was multiplied by the $t_{maxDSC}$ value. The product was normalized by a factor of 100000 (10^5).

Molecular Weight Distribution Determination

The determination of the molar mass distributions and the means Mn, Mw, Mz and Mw/Mn derived therefrom was carried out by high-temperature gel permeation chromatography using a method described in ISO 16014-1, -2, -4, issues of 2003. The solvent was 1,2,4-trichlorobenzene (TCB). The temperature of apparatus and solutions was 135° C. A PolymerChar (Valencia, Paterna 46980, Spain) IR-4 infrared detector, capable for use with TCB, was the concentration detector. A WATERS Alliance 2000 equipped with pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series, was used.

The solvent was vacuum distilled under nitrogen and stabilized with 0.025% by weight of 2,6-di-tert-butyl-4-methylphenol. The flowrate used was 1 ml/min. The injection was 500 µl. The polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with hexadecane.

The calibration curve was then adapted to polyethylene (PE) by means of the Universal Calibration method (Benoit H., Rempp P. and Grubisic Z., & in J. Polymer Sci., Phys. Ed., 5, 753(1967)). The Mark-Houwing parameters used were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C. Data recording, calibration and calculation was carried out using NTGPC_Control_V6.02.03 and NTGPC_V6.4.24 (hs GmbH, Hauptstraße 36, D-55437 Ober-Hilbersheim, Germany) respectively.

Melt Flow Index

Determined according to ISO 1133-2:2011 at 190° C. with the specified load.

Long Chain Branching Index (LCBI)

The LCB index corresponds to the branching factor g', measured for a molecular weight of $10^6$ g/mol. The branching factor g', which allows determining long-chain branches at high Mw, was measured by Gel Permeation Chromatography (GPC) coupled with Multi-Angle Laser-Light Scattering (MALLS). The radius of gyration for each fraction eluted from the GPC (with a flow-rate of 0.6 ml/min and a column packed with 30 am particles) was measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software.

The parameter g' is the ratio of the measured mean square radius of gyration to that of a linear polymer having the same molecular weight. Linear molecules show g' of 1, while values less than 1 indicate the presence of LCB. Values of g' as a function of mol. weight, M, were calculated from the equation:

$$g'(M)=<Rg^2>_{sample,M}/<Rg^2>_{linear\ ref,M}$$

where $<Rg^2>$, M is the root-mean-square radius of gyration for the fraction of mol. weight M.

The radius of gyration for each fraction eluted from the GPC (with a flow-rate of 0.6 ml/min and a column packed with 30 μm particles) was measured by analyzing the light scattering at the different angles. The mol. weight M and $<Rg^2>_{sample,M}$ were determined, and the g' was defined at a measured M=$10^6$ g/mol. The $<Rg^2>_{linear\ ref,M}$ was calculated by the relation between radius-of-gyration and molecular weight for a linear polymer in solution (Zimm B H, Stockmayer W H, "The Dimensions of Chain Molecules Containing Branches and Rings" The Journal of Chemical Physics 17, 1301 (1949)) and confirmed by measuring a linear PE reference.

The two linear PE references IUPAC 5A and IUPAC 5B were used for experimental validation.

The protocol was described in the following documents. Zimm B H, Stockmayer W H (1949) *The dimensions of chain molecules containing branches and rings*. J Chem Phys 17; and
Rubinstein M., Colby R H. (2003), *Polymer Physics*, Oxford University Press Comonomer Content The comonomer content was determined by IR in accordance with ASTM D 6248 98, using an FT-IR spectrometer Tensor 27 from Bruker, calibrated with a chemometric model for determining ethyl- or butyl-side-chains in PE for butene or hexene as comonomer, respectively. The result was compared to the estimated comonomer content derived from the mass-balance of the polymerization process and found to be in agreement.

Swell Ratio

The Swell-ratio was measured utilizing a capillary rheometer, Gottfert Rheotester2000 and Rheograph25, at T=190° C., equipped with a 30/2/2/20 die (total length 30 mm, Active length=2 mm, diameter=2 mm, L/D=2/2 and 20° entrance angle) and an optical device (laser-diod from Gottfert) for measuring the extruded strand thickness. The sample was melted in the capillary barrel at 190° C. for 6 min and extruded with a piston velocity corresponding to a resulting shear-rate at the die of 1440 $s^{-1}$.

The extrudate was cut (by an automatic cutting device from Gottfert) at a distance of 150 mm from the die-exit, at the moment the piston reaches a position of 96 mm from the die-inlet. The extrudate diameter was measured with the laser-diod at a distance of 78 mm from the die-exit, as a function of time. The maximum value corresponded to the $D_{extrudate}$. The swell-ratio was determined from the calculation:

$$SR=(D_{extrudate}-D_{die})100\%/D_{die}$$

where $D_{die}$ is the corresponding diameter at the die exit, measured with the laser-diode.

Notched Tensile Impact Test Atn

The tensile-impact strength was determined using ISO 8256:2004 with type 1 double notched specimens according to method A. The test specimens (4×10×80 mm) were cut from a compression molded sheet which was prepared according ISO 1872-2 (average cooling rate 15 K/min and high pressure during cooling phase). The test specimens were notched on two sides with a 45° V-notch. Depth was 2±0.1 mm and curvature radius on notch dip was 1.0±0.05 mm.

The free length between grips was 30±2 mm. Before measurement, the test specimens were conditioned at a constant temperature of −30° C. over a period of from 2 to 3 hours. The procedure for measurements of tensile impact strength including energy correction following method A was described in ISO 8256.

Environmental Stress Cracking Resistance According to Full Notch Creep Test (FNCT)

The environmental stress cracking resistance of polymer samples was determined in accordance to international standard ISO 16770 (FNCT) in aqueous surfactant solution. From the polymer sample a compression molded 10 mm thick sheet was prepared. The bars with squared cross section (10×10×100 mm) were notched using a razor blade on four sides perpendicularly to the stress direction. A notching device described in M. Fleissner in Kunststoffe 77 (1987), pp. 45 was used for the sharp notch with a depth of 1.6 mm.

The load applied was calculated from tensile force divided by the initial ligament area. Ligament area was the remaining area=total cross-section area of specimen minus the notch area. For FNCT specimen: 10×10 $mm^2$−4 times— of trapezoid notch area=46.24 $mm^2$ (the remaining cross-section for the failure process/crack propagation). The test specimen was loaded with standard condition suggested by the ISO 16770 with load, in MPa, and temperature as specified in Table 1, in a 2% (by weight) water solution of non-ionic surfactant ARKOPAL N100. Time until rupture of test specimen was detected.

Example 1

Preparation of the Spherical Catalyst Support

A magnesium chloride and alcohol adduct containing about 3 mols of alcohol was prepared following the method described in example 2 of U.S. Pat. No. 4,399,054, but working at 2000 RPM instead of 10000 RPM.

The adduct was dealcoholated up to an amount of alcohol of 25% wt via a thermal treatment, under nitrogen stream, over a temperature range of 50-150° C.

Preparation of the Solid Catalyst Component

Into a 2 L four-necked round flask, purged with nitrogen, 1 L of $TiCl_4$ was introduced at 0° C. Then, at the same temperature, 70 g of a spherical $MgCl_2$/EtOH adduct containing 25% wt of ethanol and were added under stirring. The temperature was raised to 130° C. in 3 hours and maintained for 60 minutes. Then, the stirring was discontinued. The solid product was allowed to settle. The supernatant liquid was siphoned off. Fresh $TiCl_4$ was added up to 1 L total volume. The treatment at 130° C. for 60 minutes was repeated. After settling and siphoning, the solid residue was then washed five times with hexane at 50° C. and two times with hexane at 25° C. and dried under vacuum at 30° C.

Into a 2 L four-necked glass reactor provided with a stirrer, 812 cc of hexane and 50 g of the catalyst component were introduced at 10° C., under stirring. While maintaining the internal temperature of the glass reactor at 10° C., 15 g of tri-n-octylaluminum (TNOA) in hexane (about 80 g/1) and an amount of cyclohexylmethyl-dimethoxysilane (CMMS) such as to have molar ratio TNOA/CMMS of 50, were slowly introduced into the reactor. After 10 minutes of stirring, a total amount of 65 g of propylene were introduced into the reactor at the same temperature in 6.5 hours at a constant rate. Then, the contents of the glass reactor were filtered and washed three times with hexane at a temperature of 30° C. (100 g/1). After drying, the resulting pre-polymerized catalyst (A) was analyzed and found to contain 55% wt of polypropylene, 2.0% wt Ti, 9.85% wt Mg and 0.31% wt Al.

About 100 g of the solid prepolymerized catalyst were charged in a glass reactor purged with nitrogen and slurried with 1.0 L of heptane at 50° C.

Then, ethylacetate (EAA) and tetrahydrofuran (CE) were added dropwise (in 60') in such an amount to have a molar ratio of 4 between Mg/EAA and 4 between Mg and CE.

The slurry was kept under stirring for 1.5 h with 50° C. as internal temperature. The stirring was discontinued. The solid product was allowed to settle. The supernatant liquid was siphoned off. The solid was washed under stirring one time, adding anhydrous heptane at 50° C. up to 1 L of volume. The stirring was discontinued. The solid product was allowed to settle. The supernatant liquid was siphoned off. The volume was restored to 1 L with anhydrous heptane. The temperature was raised up to 85° C. and maintained under stirring for 2 hours. The stirring was discontinued. The solid product was allowed to settle. The supernatant liquid was siphoned off.

The solid was washed 3 times with anhydrous hexane (3×1000 mL) at 25° C., recovered, dried under vacuum and analyzed and the resulting EAA/CE molar ratio was found to be 0.93.

Polymerization

A polyethylene was prepared in a cascade of a fluidized-bed reactor and a multizone circulating reactor having two interconnected reaction zones as shown in the FIGURE.

For carrying out the polymerization, 9.1 g/h of the solid catalyst were fed using 1.2 kg/h of liquid propane to a first stirred precontacting vessel, into which also triisobutylaluminum (TIBA), diethylaluminumchloride (DEAC) were dosed. The weight ratio between triisobutylaluminum and diethylaluminumchloride was 7:1. The ratio between aluminum alkyls to the Ziegler catalyst was 5:1. The first precontacting vessel was kept at 50° C. with an average residence time of 90 minutes. The catalyst suspension of the first precontacting vessel was continuously transferred to a second stirred precontacting vessel, which was operated with an average residence time of 90 minutes and kept also at 50° C. The catalyst suspension was then transferred continuously to fluidized-bed reactor (FBR) (1) via line (2).

In fluidized-bed reactor (1), ethylene was polymerized in the presence of propane as an inert diluent using hydrogen as molecular weight regulator. 51 kg/h of ethylene, 62 g/h of hydrogen and 12 kg/h of propane were fed to fluidized-bed reactor (1) via line 3. No comonomer was added. The polymerization was carried out at a temperature of 80° C. and a pressure of 3.0 MPa. The selected feed rates resulted in an ethylene concentration in the reactor of 8.5 vol.-% and a molar ratio of hydrogen/ethylene in the reactor of 0.8.

The polyethylene produced in fluidized-bed reactor (1) had a MIE of 2.5 g/10 min and a density of 0.959 g/cm$^3$.

The polyethylene produced in fluidized-bed reactor (1) was continuously transferred to multizone circulating reactor (MZCR), which was operated at a pressure of 2.6 MPa and a temperature of 80° C. measured at the gas exit from reactor. The riser (5) had an internal diameter of 200 mm and a length of 19 m. The downcomer (6) had a total length of 18 m, an upper part of 5 m with an internal diameter of 300 mm and a lower part of 13 m with an internal diameter of 150 mm. The second reactor was operated by establishing different conditions of monomers and hydrogen concentration within the riser and the downcomer. The different conditions were established by feeding via line 7, 330 kg/h of a liquid stream (liquid barrier) into the upper part of the downcomer. The liquid stream had a composition different from that of the gas mixture present in the riser. The different concentrations of monomers and hydrogen within the riser, the downcomer of the second reactor and the composition of the liquid barrier are indicated in Table 1. The barrier stream 7 came from a distillation column (6). The monomers to the downcomer were fed in 3 positions. In dosing point 1 (8), located just below the barrier, 25 kg/h of liquid condensate (10), 10 kg/h of ethylene (9) and 70 g/h of 1-hexene (9) were introduced. In dosing point 2 (11), located 2.3 meters below dosing point 1, 15 kg/h of liquid condensate (13) and 6 kg/h of ethylene (12) were introduced. To lower the molecular weight of the bottom part of the downcomer, 2 kg/h of gas from the top of the distillation column (6) were dosed to dosing point 2 (11) via line 17. In dosing point 3 (14), located 4.0 meters below dosing point 2, 15 kg/h of liquid condensate (16) and 6 kg/h of ethylene (15) were dosed. 5 kg/h of propane, 31.1 kg/h of ethylene and 28 g/h of hydrogen were fed through line 19 into the recycling system.

The final polymer was discontinuously discharged via line 18.

The polymerization process in the second reactor produced relatively high molecular weight polyethylene fractions. In Table 1 the properties of the final product are specified.

The first reactor produced around 48% by weight (split wt %) of the total amount of the final polyethylene resin produced by both first and second reactors.

The resulting polyethylene polymer had a final MIF of 2.8 g/10 min. The density was 0.953 g/cm$^3$.

The comonomer (hexene-1) amount was of about 0.05% by weight.

Comparative Example 1

The polymer of the comparative example was a polyethylene composition produced in gas phase with a chromiumcontaining catalyst, commercially available under the trademark Novapol HW-B-355A from Nova.

TABLE 1

|  | Ex. 1 | Comp. 1 |
|---|---|---|
| Operative conditions first reactor | | |
| H$_2$/C$_2$H$_4$ Molar ratio | 0.8 | — |
| C$_2$H$_4$ % | 8.2 | — |
| Density of A) (g/cm$^3$) | 0.959 | — |
| MIE [2.16 kg] of A) (g/10 min.) | 2.5 | — |
| Split (wt. %) | 48.5 | — |
| Operative conditions second reactor | | |
| H$_2$/C$_2$H$_4$ Molar ratio riser | 0.27 | — |
| C$_2$H$_4$ % riser | 10.8 | — |
| C$_6$H$_{12}$ % riser | 0.06 | — |
| H$_2$/C$_2$H$_4$ Molar ratio downcomer (below dosing point 1) | 0.007 | — |
| C$_2$H$_4$ % downcomer (below dosing point 1) | 4.6 | — |
| C$_6$H$_{12}$ % downcomer (below dosing point 1) | 0.04 | — |
| H$_2$/C$_2$H$_4$ Molar ratio downcomer (below dosing point 3) | 0.026 | — |
| C$_2$H$_4$ % downcomer (below dosing point 3) | 3.9 | — |
| C$_6$H$_{12}$ % downcomer (below dosing point 3) | 0.03 | — |
| H$_2$/C$_2$H$_4$ Molar ratio barrier | 0.004 | — |
| C$_2$H$_4$ % barrier | 7.1 | — |
| C$_6$H$_{12}$ % barrier | 0.09 | — |
| Final Polymer properties | | |
| MIF [21.6 kg] (g/10 min.) | 2.5 | 3.1 |
| MI10 [10 kg] (g/10 min.) | 0.39 | 0.42 |
| MIF/MI10 | 6.5 | 7.5 |
| Density (g/cm$^3$) | 0.953 | 0.954 |
| Swell ratio (%) | 196 | 192 |
| Mw (g/mol) | 516946 | 474671 |
| Mz (g/mol) | 2925200 | 5292680 |
| Mw/Mn | 61.5 | 35.4 |
| LCBI | 0.70 | >0.98 |
| Comonomer content IR (% by weight) | 0.05% | <0.8 |
| $\eta_{0.02}$ | 428146 | 402039 |
| ($\eta_{0.02}$/1000)/LCBI | 612 | <410 |
| aTN −30° C. (kJ/m$^2$) | 298 | 152 |
| FNCT* 4 MPa/80° C. (hours) | 10 | 8 |
| FNCT* 9 MPa/50° C. (hours) | 22 | 13 |
| HMW COPO Index | 3.4 | 4.4 |
| ET | 127 | 3180 |

Notes:
C$_2$H$_4$ = ethylene; C$_6$H$_{12}$ = hexene;
*aqueous solution of 2% Arkopal N100

What is claimed is:

1. A polyethylene composition having the following features:
   1) a density from 0.945 to 0.958 g/cm$^3$ determined according to ISO 1183 at 23° C.;
   2) a ratio MIF/MI10 from 2 to 10, where MIF is the melt flow index at 190° C. with a load of 21.60 kg, and MI10 is the melt flow index at 190° C. with a load of 10 kg, both determined according to ISO 1133;
   3) a $\eta_{0.02}$ from 200,000 to 800,000 Pa·s, wherein $\eta_{0.02}$ is the complex shear viscosity at an angular frequency of 0.02 rad/s, measured with dynamic oscillatory shear in a plate-plate rotational rheometer at a temperature of 190° C.;
   4) a long-chain branching index, LCBI equal to or lower than 0.80, wherein LCBI is the ratio of the measured mean-square radius of gyration R$_g$, measured by GPC-MALLS, to the mean-square radius of gyration for a linear PE having the same molecular weight, at a molecular weight of 1,000,000 g/mol; and
   5) a ratio $\eta_{0.02}$/1000)/LCBI, which is between $\eta_{0.02}$ divided by 1000 and LCBI, equal to or greater than 350.

2. The polyethylene composition of claim 1 comprising; one or more ethylene copolymers derived from ethylene and one or more comonomers.

3. The polyethylene composition of claim 2, wherein the comonomer or comonomers present in the ethylene copolymers are selected from olefins having formula CH2=CHR wherein R is an alkyl radical, linear or branched, having from 1 to 10 carbon atoms.

4. The polyethylene composition of claim 1 obtained by using a Ziegler-Natta polymerization catalyst.

5. The polyethylene composition of claim 4, wherein the Ziegler-Natta polymerization catalyst comprises:
   the product of a reaction of:
   A) a solid catalyst component comprising Ti, Mg, chlorine and one internal electron donor ED selected from esters of aliphatic monocarboxylic acids (EAA) and another internal donor ED$^I$ selected from cyclic ethers (CE) in an amount such that the EAA/CE molar ratio ranges from 0.02 to less than 20;
   B) an organo-Al compound; and optionally
   C) an external electron donor compound.

6. The polyethylene composition of claim 1, having at least one of the following additional features:
   a Mz from 1,500,000 to 8,000,000 g/mol;
   a MIF from 0.5 to 10 g/10 min.;
   a comonomer content equal to or less than 2% by weight, with respect to the total weight of the composition;
   a HMWcopo index from 1 to 15;
   wherein the HMWcopo index is determined according to the following formula:

$$HMWcopo = (\eta_{0.02} \times t_{maxDSC})/(10^5)$$

where the tmaxDSC—is the time, in minutes, to reach the maximum value of heat flow (in mW) of crystallization (time at which the maximum crystallization rate is achieved, equivalent to the t1/2 crystallization half-time) at a temperature of 124° C. under quiescent conditions, measured in isothermal mode in a differential scanning calorimetry apparatus, DSC;
   a ET higher than 30,
   wherein ET is calculated from:

$$ET = C_2/G^* \text{ at } \tan\delta = C_3$$

wherein:
   $G^* = [(G')^2 + (G'')^2]^{1/2}$;
   $\tan\delta = G''/G'$;
   $C_2 = 10^6$ dyn/cm$^2$
   $C_3 = 1.5$,
   G'=storage-modulus, and
   G"=loss-modulus,
   both G' and G" being measured with dynamic oscillatory shear in a plate-plate rotational rheometer at a temperature of 190° C.; or
   Mz/Mw*LCBI of lower than 10.

7. The polyethylene composition of claim 1, comprising:
   A) 30-70% by weight of an ethylene homopolymer or copolymer with density equal to or greater than 0.956 g/cm$^3$ and melt flow index MIE at 190° C. with a load of 2.16 kg, according to ISO 1133, of 0.5 g/10 min. or higher; and
   B) 30-70% by weight of an ethylene copolymer having a MIE value lower than the MIE value of A).

8. An article of manufacturing comprising:
   the polyethylene composition of claim 1.

9. The article of manufacture according to claim 8, wherein the article is a blow-molded hollow article.

10. The article of manufacture according to claim 9, wherein the article is a L-Ring Drum or an Open Top Drum.

11. A process for preparing the polyethylene composition of claim 1, wherein the polymerization steps are carried out in the presence of a Ziegler-Natta polymerization catalyst supported on $MgCl_2$.

12. The process of claim 11, comprising the following steps, in any order:
   a) polymerizing ethylene, optionally together with one or more comonomers, in a gas-phase reactor in the presence of hydrogen; and
   b) copolymerizing ethylene with one or more comonomers in another gas-phase reactor in the presence of an amount of hydrogen less than step a),
   where, in at least one of the gas-phase reactors, the growing polymer particles flow upward through a first polymerization zone under fast fluidization or transport conditions, leave the first polymerization zone and enter a second polymerization zone through which the polymer particles flow downward under the action of gravity, leave the second polymerization zone and are reintroduced into the first polymerization zone, thereby establishing a circulation of polymer between the two polymerization zones.

* * * * *

UNITED STATES PATENT AND TRADEMARK OFFICE
CERTIFICATE OF CORRECTION

| | | |
|---|---|---|
| PATENT NO. | : 11,236,183 B2 | |
| APPLICATION NO. | : 17/053633 | |
| DATED | : February 1, 2022 | |
| INVENTOR(S) | : Doetsch et al. | |

It is certified that error appears in the above-identified patent and that said Letters Patent is hereby corrected as shown below:

In the Specification

In Column 4, Line 34, delete "Ziegler-Nana" and insert -- Ziegler-Natta --, therefor In Column 11, Line 63, delete "$\eta^*(\omega) = [G'(\omega))^2 + G''(\omega)^2]^{1/2}/\omega$" and insert -- $\eta^*(\omega) = [G'(\omega)^2 + G''(\omega)^2]^{1/2}/\omega$ --, therefor In Column 13, Line 18, delete "30 am" and insert -- 30μm --, therefor In the Claims In Column 18, Claim 2, Line 3, delete "comprising;" and insert -- comprising: --, therefor In Column 18, Claim 3, Line 8, delete "CH2=CHR" and insert -- $CH_2$=CHR --, therefor In Column 18, Claim 6, Line 30, delete ";" and insert -- , --, therefor In Column 18, Claim 6, Line 48, delete ";" and insert -- , --, therefor In Column 18, Claim 6, Line 49, delete ";" and insert -- , --, therefor In Column 18, Claim 6, Line 50, after "$dyn/cm^2$" insert -- , --

Signed and Sealed this
Twentieth Day of August, 2024

Katherine Kelly Vidal
*Director of the United States Patent and Trademark Office*